1,467,639

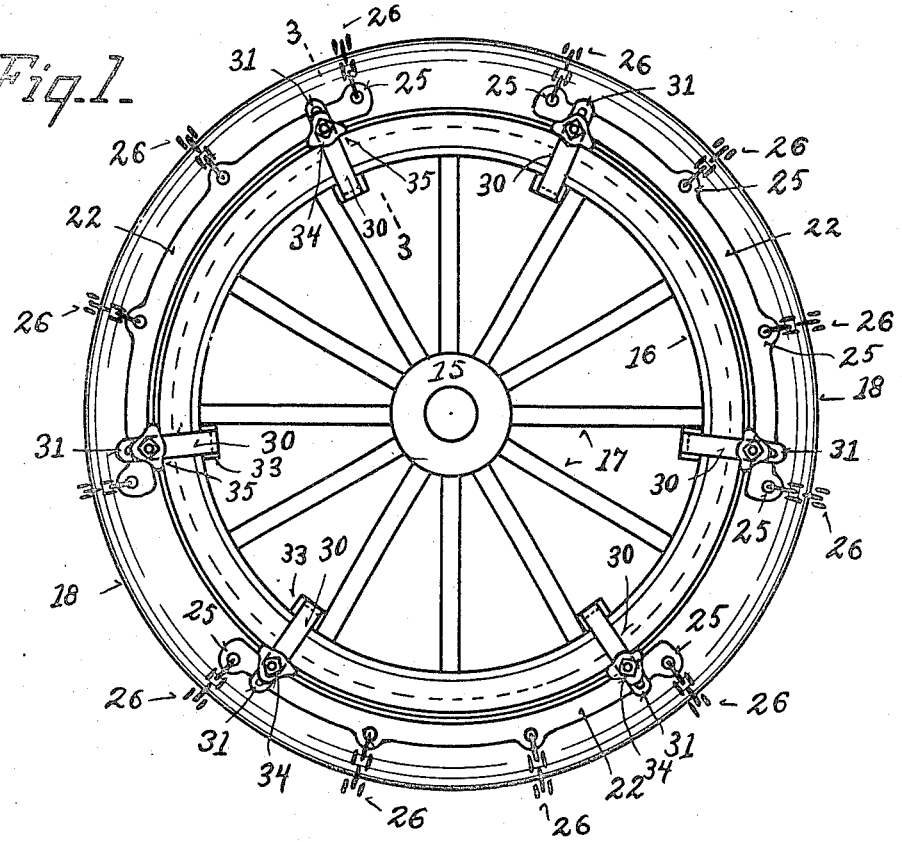
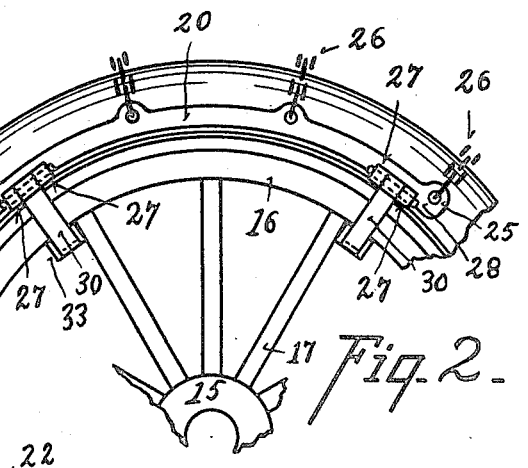
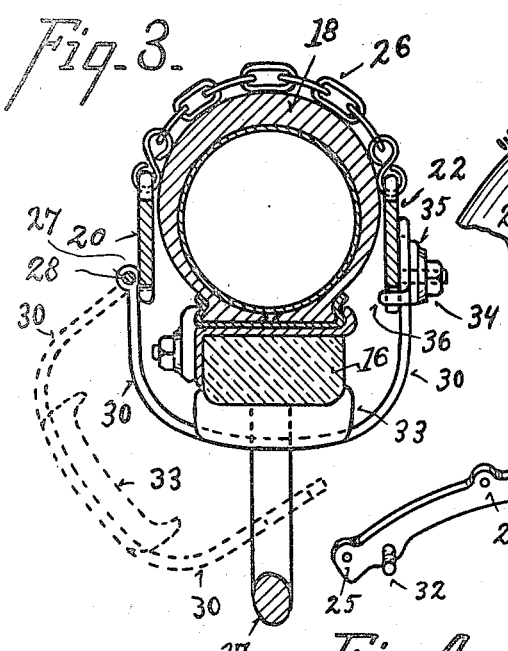
Inventor
Patrick G. Hughes,
By C. W. Miles,
Attorney Patented Sept. 11, 1923.

UNITED STATES PATENT OFFICE.

PATRICK G. HUGHES, OF CINCINNATI, OHIO.

VEHICLE TIRE-CHAIN APPARATUS.

Application filed February 3, 1922. Serial No. 533,901.

*To all whom it may concern:*

Be it known that I, PATRICK G. HUGHES, a citizen of the United States, residing at Cincinnati, in the county of Hamilton and State of Ohio, have invented certain new and useful Improvements in Vehicle Tire-Chain Apparatus, of which the following is a specification.

My invention relates to improvements in vehicle tire chain apparatus. One of its objects is to provide an improved tire chain apparatus adapted to be conveniently applied and removed in sections. Another object is to provide an improved tire chain sectional structure of strength and reliability. Another object is to provide improved means to apply and space the chains. Another object is to provide improved means to attach the tire chain sections to the wheels so as to retain their positions and resist the strains normally encountered. My invention also comprises certain details of form, combination and arrangement, all of which will be fully set forth in the description of the accompanying drawings, in which:

Fig. 1, is a side elevation of a vehicle wheel and tire from the outside with my improved tire chain apparatus applied thereto.

Fig. 2, is a side elevation of a portion of the same wheel and tire chain apparatus from the inside.

Fig. 3 is an enlarged sectional detail taken on line 3—3 of Fig. 1.

Fig. 4 is a perspective view of one of the side bars of my improved apparatus detached.

The accompanying drawings illustrate the preferred embodiment of my invention in which 15 represents a vehicle wheel having a felly 16 and spokes 17 and tire 18 either a pneumatic or solid tire mounted upon said felly 16 in any suitable manner.

My improved tire chain apparatus is constructed so as to be applied to and removed from the wheels in sections, so that one or more sections may be independently applied to each wheel as may be required, and can be conveniently applied and removed, and so that a rupture of any part or section would not be liable to result in the loss of an entire tire chain, and would not be likely to result in the loss of even an entire chain section.

Each tire chain section comprises a pair of curved rigid side bars 20 and 22 positioned alongside of the tire upon opposite sides thereof and opposite one another. The side rails or bars 20 and 22 are preferably of cast steel or semi-steel and of sufficient length to extend over approximately one-sixth to one-fourth of the circumference of the tire so that from three to five sections applied to one wheel will afford one or more chain members in contact with the ground at any position of the wheel. Each of said bars 20 and 22 is provided with a series of eyes 25 and a plurality of chain members 26 are connected respectively at one end to an eye 25 of the bar 20 and at its opposite end to an eye 25 of the bar 22, so that the bars 20 and 22 are connected together in pairs at intervals throughout their lengths by a series of chain members 26, of which there are preferably three or more to each pair of bars 20 and 22. When the tire chain sections are applied to the tires the several chain members 26 rest transversely of and upon the periphery of the tire and extend from the bar 20 on one side of the tire to the bar 22 on the other side of the tire.

Hinged to the bar 20 which is preferably placed upon the inside of the wheel or toward the vehicle body by means of hinge lugs 27 formed integral with the bar 20, and hinge bolts 28 are a pair of yoke shaped locking members 30. The free ends of the locking members 30 are provided with slots 31 which engage over the ends of stud bolts 32 preferably rigidly attached to or formed integral with the bar 22 and drawn up into place so as to bring the rubber cushions or resilient pads 33 firmly into contact with the inner face of the wheel felly 16 whereupon clamping nuts 34 and washers 35 are applied to the stud bolts 32 and tightened up to clamp the locking members 30 firmly to the bar 22. The washers 35 are provided with ears or projections 36 to engage one edge of the bar 22 to prevent the washers turning with the nuts 34.

My improved tire chain sections are adapted to be applied to the wheels of trucks or pleasure vehicles, and are particularly adapted to cling and lock to the rim and tire so as to afford reliable traction without liability to detach or lose the tire sections. The several chain members are also firmly spaced apart, and the whole conveniently applied and detached in sections.

The apparatus herein shown and described is capable of considerable modification without departing from the spirit of my invention.

What I claim is:

1. A tire chain apparatus comprising a pair of rigid side bars adapted to extend along and adjacent to opposite sides of a fraction of the tire, a plurality of spaced chain sections, each connected at opposite ends to said respective side bars and adapted to extend from one of said side bars to the other over the periphery of the tire, and a pair of yoke shaped members each hinged directly to one of said side bars near one end of said side bar and directly attached across the felly to the opposite side bar near one end thereof.

2. A tire chain apparatus comprising a pair of rigid side bars adapted to extend along and adjacent to opposite sides of a fraction of the tire, a plurality of spaced chain sections each connected at opposite ends to said respective side bars and adapted to extend from one of said side bars to the other across the periphery of the tire, and a pair of yoke members directly hinged at one end to one of said side bars near the end of said side bar, each of said yoke members being slotted at its free end to directly, adjustably and detachably engage a projection carried by the opposite of said side bars, and means to rigidly clamp the free ends of said yoke members and said last named side bar together.

In testimony whereof I have affixed my signature.

PATRICK G. HUGHES.